United States Patent [19]
Kumagawa

[11] Patent Number: 6,057,055
[45] Date of Patent: May 2, 2000

[54] BATTERY-COVER LOCK MECHANISM WITH OPERATING AND BACK-UP BATTERIES

[75] Inventor: Shinji Kumagawa, Tokyo, Japan

[73] Assignee: NEC Corporation, Japan

[21] Appl. No.: 09/058,091

[22] Filed: Apr. 9, 1998

[30] Foreign Application Priority Data

Apr. 11, 1997 [JP] Japan ................................. 9-092648

[51] Int. Cl.[7] .................................................. H01M 2/10
[52] U.S. Cl. ........................................................ 429/97
[58] Field of Search .............................. 439/500; 429/97, 429/99

[56] References Cited

U.S. PATENT DOCUMENTS

| | | | |
|---|---|---|---|
| 5,039,580 | 8/1991 | Mori et al. | 429/97 |
| 5,149,604 | 9/1992 | Nakanishi | 429/97 |
| 5,328,781 | 7/1994 | Mikake | 429/97 |
| 5,608,612 | 3/1997 | Hokao | 429/97 |

FOREIGN PATENT DOCUMENTS 7-7278  1/1995  Japan .

*Primary Examiner*—Neil Abrams
*Attorney, Agent, or Firm*—Ostrolenk, Faber, Gerb & Soffen, LLP

[57] ABSTRACT

A battery-cover lock mechanism for portable apparatus includes a housing (5) having an operating-battery receiving region (5a) and a backup-battery receiving region (5b) and two separate covers (2, 3) for each region. The housing (5) further includes a slidable lock button (4) that is movable in an L-shaped path and that effects motion of a lock lever (6) that in one position (FIG. 6) by means of tongues (7, 8) locks both covers (2, 3); in a second position (FIG. 5), locks only one cover (2); and in a third position (FIG. 4) locks only the other cover (3). In an alternative embodiment (FIGS. 7 and 8), a sensor rod (17) is included for preventing removal of the back-up battery cover (3) when an operating battery (12) is not present.

14 Claims, 5 Drawing Sheets

6,057,055

BATTERY-COVER LOCK MECHANISM WITH OPERATING AND BACK-UP BATTERIES

BACKGROUND OF THE INVENTION

1. Field of the Invention

This invention relates to a battery-cover lock mechanism for a portable terminal equipment, such as an electronic pocketbook, in which a backup battery is used in addition to an operating battery.

2. Description of the Related Art

Various battery-cover lock mechanisms of the described type have recently been increasingly put into practice especially for use in portable terminal apparatuses or equipment (hereinafter also called the portable terminal), such as electronic pocketbooks, in an effort to prevent backup data from disappearing in error during exchanging of the operating battery.

This conventional art is exemplified by Japanese Patent Laid-Open Publication No. Hei 7-7278. The conventional locking technology disclosed in this Japanese publication is shown in FIG. 9 of the accompanying drawings of the present invention. As shown in FIG. 9, an operating-battery closure 22, a backup-battery closure 23 and a sliding knob or button 24 are supported on the rear or bottom surface of a lower case or housing 21 as of a portable terminal. The operating- and backup-battery closures 22, 23 each have a non-illustrated engaging portion; the button 24 is slidable, in response to manipulation of the user's finger, on the bottom surface of the lower housing 21 linearly in opposite directions of arrows E, F between a first locking position (left in FIG. 9) where a non-illustrated locking lever (presumably fixed to or integral with the button 24) comes into locking engagement with the engaging portion of the operating-battery closure 22 only and a second locking position (right in FIG. 9) where the locking lever comes into locking engagement with the engaging portion of the backup-battery closure 23 only. Thus as the knob is moved selectively in either direction, only a selective one of the two closures is locked.

However, having a string of two locking positions arranged along a mere straight line, it is difficult to adjustably slide the button 24 to a proper selected position to meet the situation. Yet in the absence of the user's careful attention during battery exchange, it is highly likely that an intended closure or closures would fail to be locked or would be locked incorrectly.

SUMMARY OF THE INVENTION

It is therefore an object of the present invention to provide a battery-cover lock mechanism, for use especially in a portable terminal equipment such as an electronic pocketbook, which can surely lock an operating-battery cover and a backup-battery individually or collectively in option so as not to be inadvertently removed, thus preventing backup data from disappearing during battery exchange.

According to the invention, the above object is accomplished by a battery-cover lock mechanism for an battery-operated portable apparatus in which a backup battery is to be used in addition to an operating battery, comprising: a latch for securing the operating battery and the backup battery of the portable equipment in position individually or collectively in option; a lower housing having a first seat in which the operating battery is to be set, a second seat in which the backup battery is to be set, and a third seat in which the latch is to be set; an operating-battery cover for covering the first seat; and a backup-battery cover for covering the second seat; the latch including a lock button extending through the lower housing and a lock lever fixed to the lock button so as to sandwich the lower housing between the lock button and the lock lever; the lock lever having a first locking portion for releasably locking the operating-battery cover in a first direction and a second locking portion for releasably locking the backup-battery cover in a second direction substantially perpendicular to the first direction; the operating-battery cover having a first engaging portion adapted to be engaged with and disengaged from the first locking portion of the lock lever; the backup-battery cover having a second engaging portion adapted to be engaged with and disengaged from the second locking portion of the lock lever.

Specifically, when the first locking portion of the lock lever is brought into locking engagement with the operating-battery cover in the first direction, the locking button travels along an L-shaped track. And when the second locking portion of the lock lever is brought into locking engagement with the backup-battery cover in the second direction, the locking button travels along a straight track.

Preferably, both the lock button and the lock lever are located between the operating-battery cover and the backup-battery cover. The lock button and the lock lever are fixed together by an E ring.

Yet preferably, the first engaging portion of the operating-battery cover, the lower housing and the first locking portion of the lock lever respectively have a first claw, a second claw and a first tongue, the first and second claws being interengageable in such manner that the first claw is sandwiched between the second claw and the first tongue, thereby locking the operating-battery cover.

Further, the second engaging portion of the backup-battery cover has a shelf and the second locking portion of the lock lever has a second tongue adapted to enter the shelf, thereby locking the backup-battery cover.

In addition, the battery-cover lock mechanism of the invention is particularly useful when incorporated in a portable terminal such as an electronic pocketbook.

Essentially, the battery-cover lock mechanism of the present invention calls for the L-shaped track which the lock button follows as it travels between the three locking positions.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The principles of the present invention are particularly useful when applied to a battery-cover lock mechanism of a portable terminal equipment (hereinafter also called the portable terminal) such as an electronic pocketbook.

Figure 1:
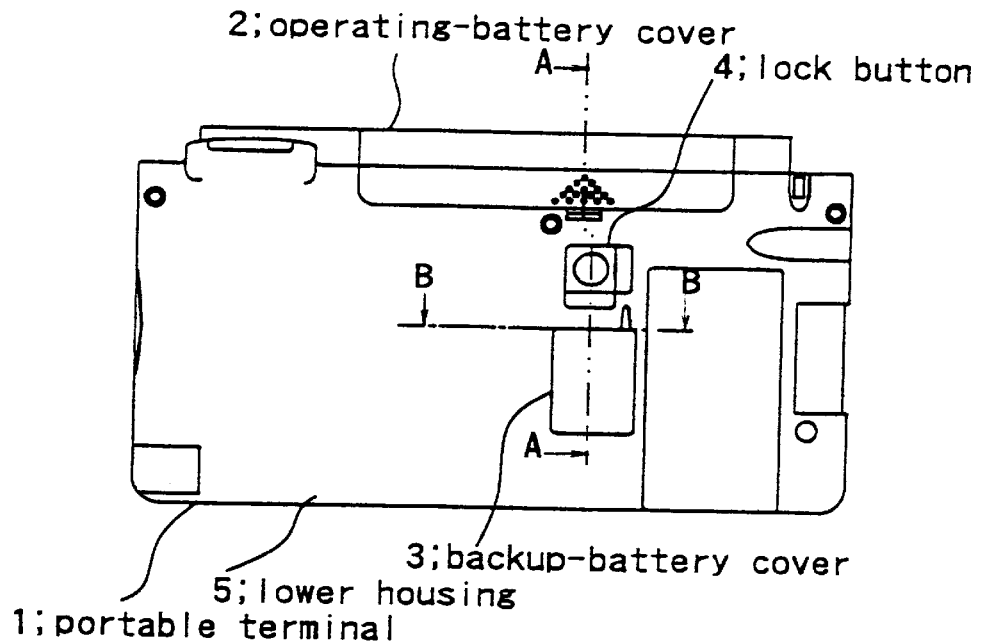
FIG. 1 is a bottom plan view of a portable terminal equipment in which a battery-cover lock mechanism according to a first embodiment of the invention is incorporated.

FIG. 1 is a bottom plan view of a portable terminal equipment in which a battery-cover lock mechanism according to a first embodiment of the invention is incorporated, the portable terminal being generally indicated by reference number 1. In the portable terminal 1, a lower case or housing 5 has in its bottom surface a first battery receiving region 5a in which a pair of 1.5-V batteries as an operating power source (hereinafter called the operating battery), and a second battery receiving region 5b in which a lithium battery as a backup power source (hereinafter called the backup battery). And an operating-battery cover 2 and a backup-battery cover 3 are supported by the lower housing 5 so as to openably cover the first and second seats, respectively. A lock button 4 is supported on the bottom surface of the lower housing 5 at an intermediate position between the operating- and backup-battery covers 2, 3.

Figure 2:
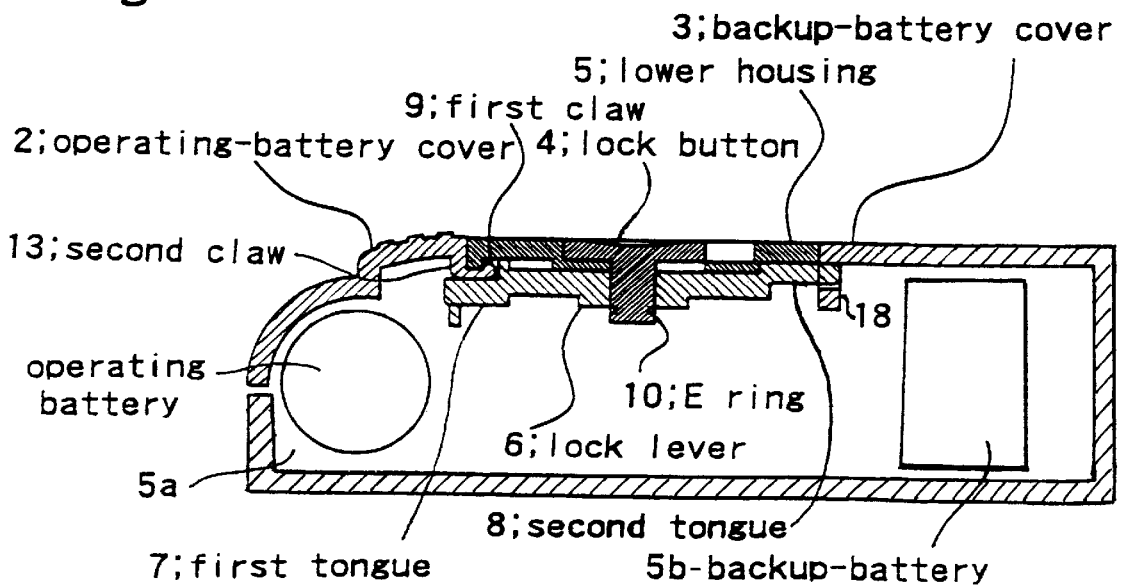
FIG. 2 is an enlarged cross-sectional view taken along line A—A of FIG. 1 with portions of the housing, the batteries and the battery receiving regions being shown schematically.

FIG. 2 is an enlarged cross-sectional view taken along line A—A of FIG. 1, showing the battery-cover lock mechanism of the first embodiment more in detail. A lock lever 6 is fixed to the lock button 4 by an E ring 10 with the lower housing 5 sandwiched between the lock lever 6 and the lock button 4. The lock lever 6 has first and second tongues 7, 8 projecting in opposite directions from its respective ends. And the operating-battery cover 2 has a first claw 9 interengageable with a second claw 13 of the lower housing 5. Further, the backup-battery cover 3 has on its inner surface (lower surface in FIG. 2) a shelf 18 for releasably receiving the second tongue 8 of the lock lever 6 in locked posture. In the meantime, the first tongue 7 of the lock lever 6 sandwiches jointly with the second claw 13 of the lower housing 5 the first claw 9 of the operating-battery cover 2.

Figure 3:
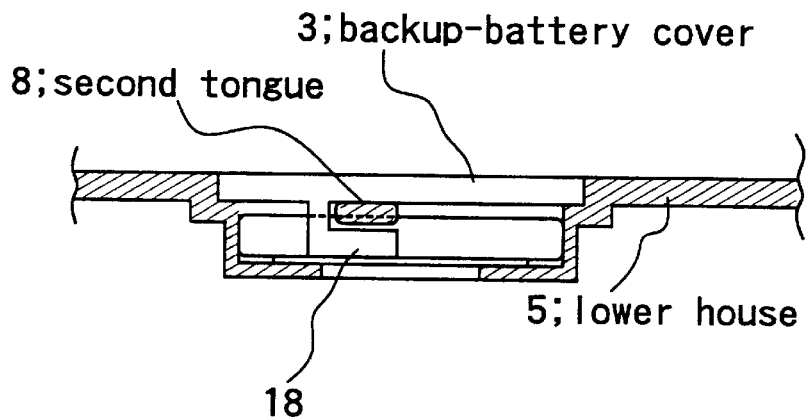
FIG. 3 is an enlarged cross-sectional view taken along line B—B of FIG. 1.

FIG. 3 is an enlarged cross-sectional view taken along line B—B of FIG. 1. In the second seat (for the backup battery) of the lower house 5, the second tongue 8 of the lock lever 6 enters the shelf 18 of the backup-battery cover 3 as mentioned above in connection with FIG. 2; for this purpose, the shelf 18 projects in an L shape from the inner surface (lower surface in FIG. 3) of the backup-battery cover 3. The backup battery is a lithium battery, whose life time is much longer as compared to alkaline or other batteries now commercially available.

The operation of the battery-cover lock mechanism of the first embodiment will now be described in detail with reference to FIGS. 4 to 6.

Figure 6:
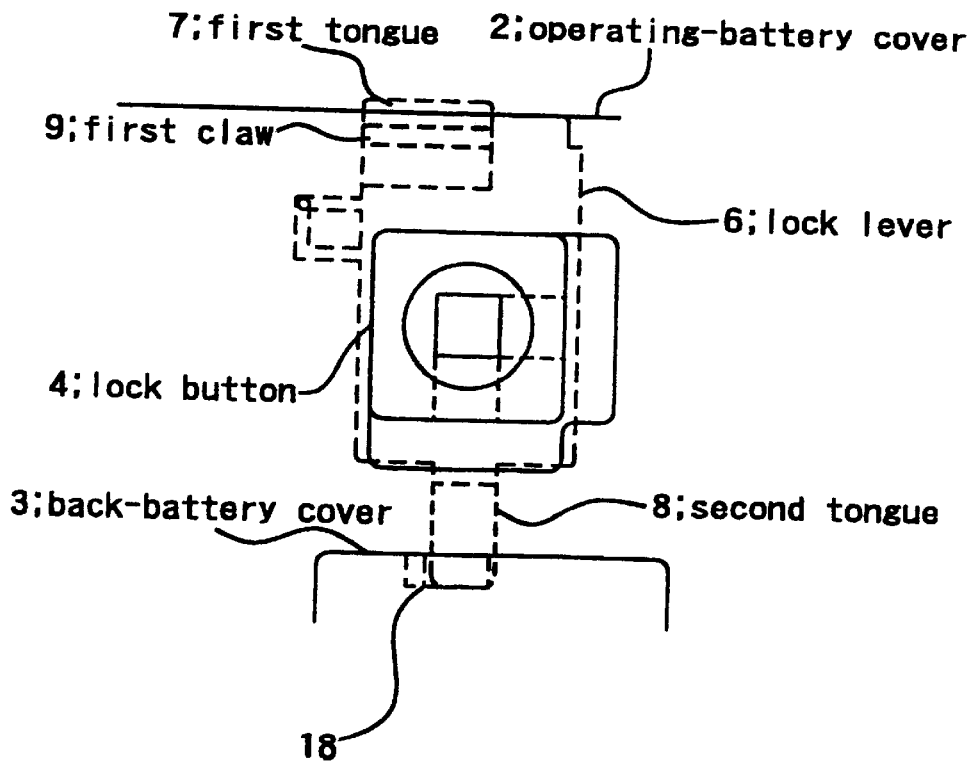
FIG. 6 is a view yet similar to FIGS. 4 and 5, but showing the lock button in a normal position where both the operating battery cover and back-up battery are locked.

FIG. 6 shows the lock button 4 of the battery-cover lock mechanism in a normal locking position. In this normal locking position, the lock button 4 is not removable off the operating- and backup-battery covers 2, 3. The operating-battery cover 2 of the lower housing 5 cannot be opened until the first claw 9 of the operating-battery cover 2 has been disengaged from the second claw of the lower housing 5. Because of the existence of the first tongue 7 of the lock lever 6 beneath the first claw 9, the operating-battery cover 2 is prevented from removing off the lock lever 6. The backup-battery cover 3 cannot be opened until the second tongue 8 of the lock lever 6 has been removed off the shelf 18. As a result, the operating-battery cover 2 and the backup-battery cover 3 are simultaneously locked.

Figure 4:
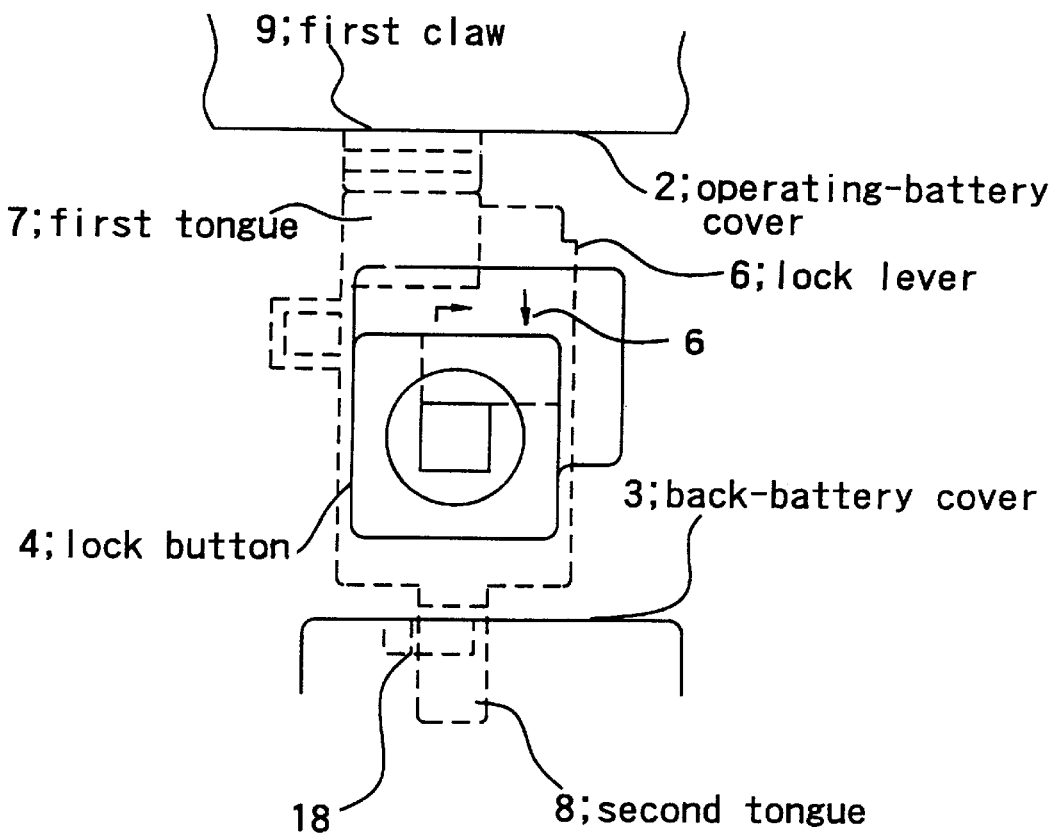
FIG. 4 is an enlarged bottom plan view of a portion of the portable terminal around the lock mechanism, showing a lock button in a second position where an operating-battery cover is open and a back-up cover is locked.
Figure 5:
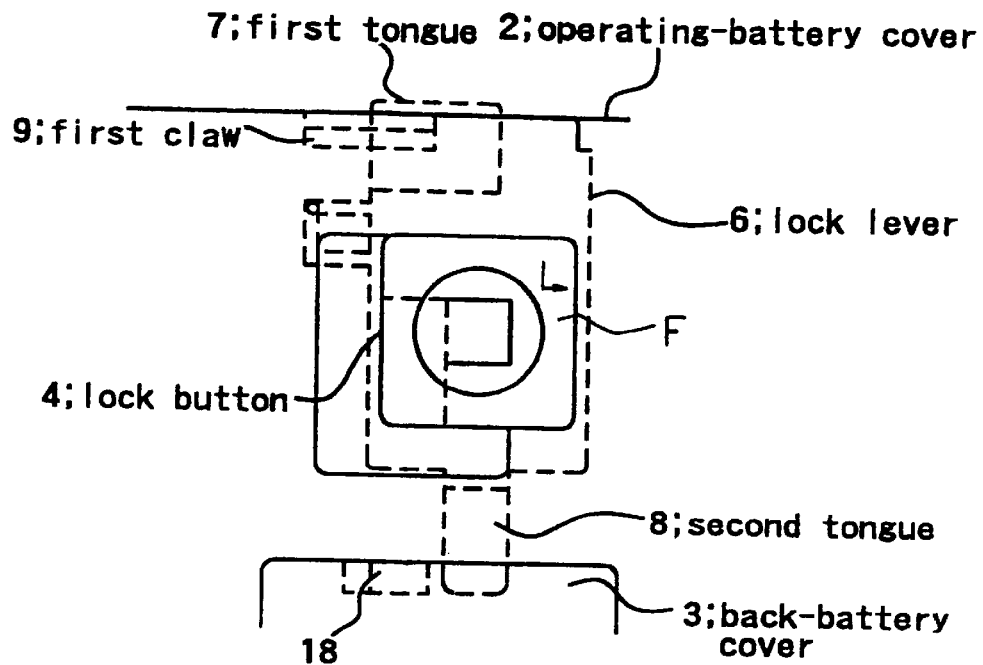
FIG. 5 is a view similar to FIG. 4, but showing the lock button in a first position where only the operating-battery cover is locked.

FIG. 5 shows the lock button 4 in a first locking position where only the backup-battery cover 3 is to be opened. As the lock button 4 is slid to this first locking position of FIG. 5 from the normal locking position of FIG. 4 in the direction of arrow F (FIG. 5) by the user's finger, the second tongue 8 of the lock lever 6 is moved along with the lock button 4 to remove off the shelf 18 of the backup-battery cover 3. This allows the backup-battery cover 2 to open so that the backup battery may be exchanged with a new one. In the meantime, because the first tongue 7 of the lock lever 6 is located beneath the first claw 9, the operating-battery cover 2 is prevented from opening. As a result, only the operating-battery cover 2 is locked.

FIG. 4 shows the lock button 4 in a second locking position where only the operating-battery cover 2 is to be opened. As the lock button 4 is slid to this second locking position of FIG. 6 from the normal locking position FIG. 6 in the direction of arrow G (FIG. 6) by the user's finger, the first tongue 7 of the lock lever 6 is moved along with the lock button 4 to remove from beneath the first claw 9 of the operating-battery cover 2. This allows the operating-battery cover 3 to open so that the operating battery may be exchanged with a new one. At that time, because the second tongue 8 of the lock lever 6 enters the shelf 18 of the of the backup-battery cover 3, the backup-battery cover 3 is prevented from opening. As a result, only the backup-battery cover 3 is locked.

As shown in FIGS. 4 to 6, to open the backup-battery cover 3, the lock button 4 is slid from the normal locking position (FIG. 6) to the first locking position (FIG. 5) in an L-shape path (arrow F) by the user's finger, and to open the operating-battery cover 2, the lock button 4 is slid from the normal locking position (FIG. 4) to the second locking position (FIG. 6) in a straight path (arrow G) by the user's finger, the direction of arrow G being substantially perpendicular to the direction of arrow F.

A modified battery-cover lock mechanism according to a second embodiment of the invention will now be described with reference to FIGS. 7 and 8.

Figure 7:
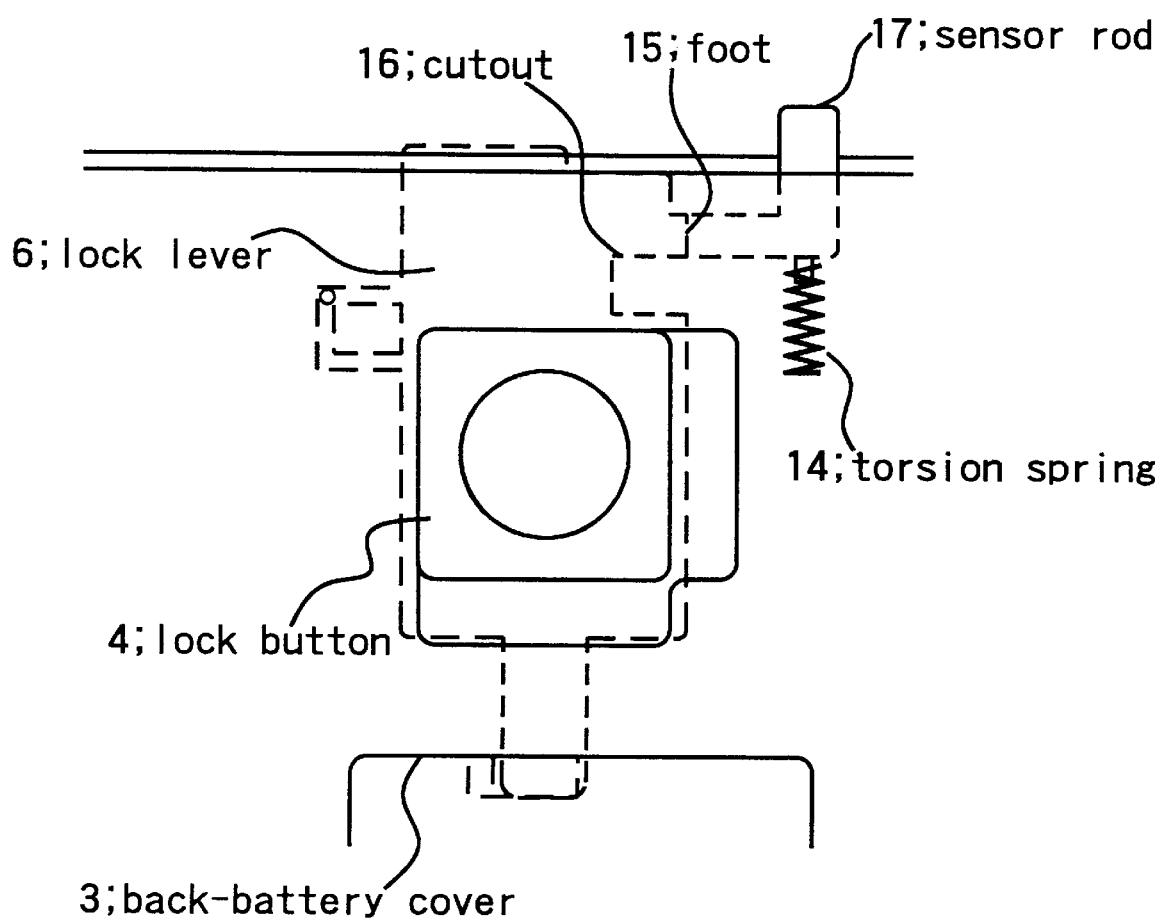
FIG. 7 is an enlarged, fragmentary bottom plan view of a modified battery-cover lock mechanism according to a second embodiment, showing a lock button in such a position as to ready to receive an operating battery to be set.

FIG. 7 shows the modified lock mechanism in such a posture that only a non-illustrated operating-battery cover (2) is opened to clear the second seat ready to receive a pair of operating batteries 12 (FIG. 8), namely, before the operating batteries are set in the second seat. In the second embodiment, unlike the first embodiment, the lock lever 6 additionally has a cutout 16. Also a sensor rod 17 is associated with the lock lever 6 for normally projecting into the second seat to detect whether or not the operating batteries 12 (FIG. 8) are set in the second seat. The sensor rod 17 is normally biased to its projected position under the resiliency of a torsion spring 14. When the second seat is devoid of the operating batteries 12, the sensor rod 17 assumes its projected position (FIG. 7) where a foot 15 projecting laterally from an inner end (lower end in FIG. 7) of the sensor rod 17 abuts the lock lever 6 so that the lock button 4 cannot be moved in such a direction as to allow the backup-battery cover 3 to open.

Figure 8:
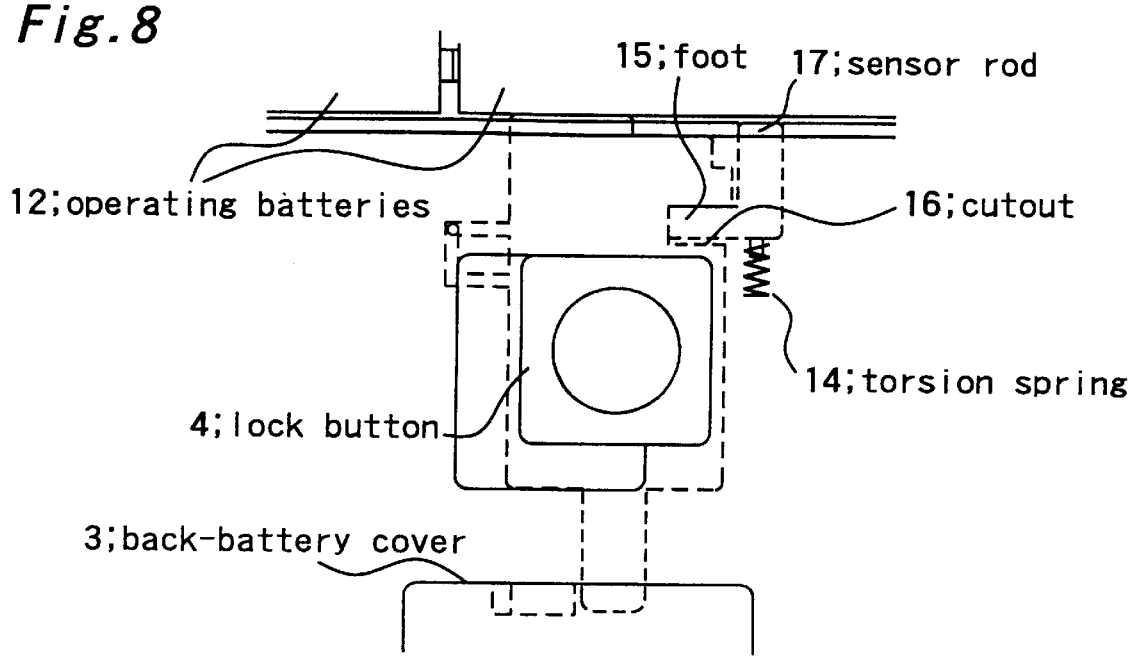
FIG. 8 is a view similar to FIG. 7, but showing the lock button after the operating battery has been set.
Figure 9:
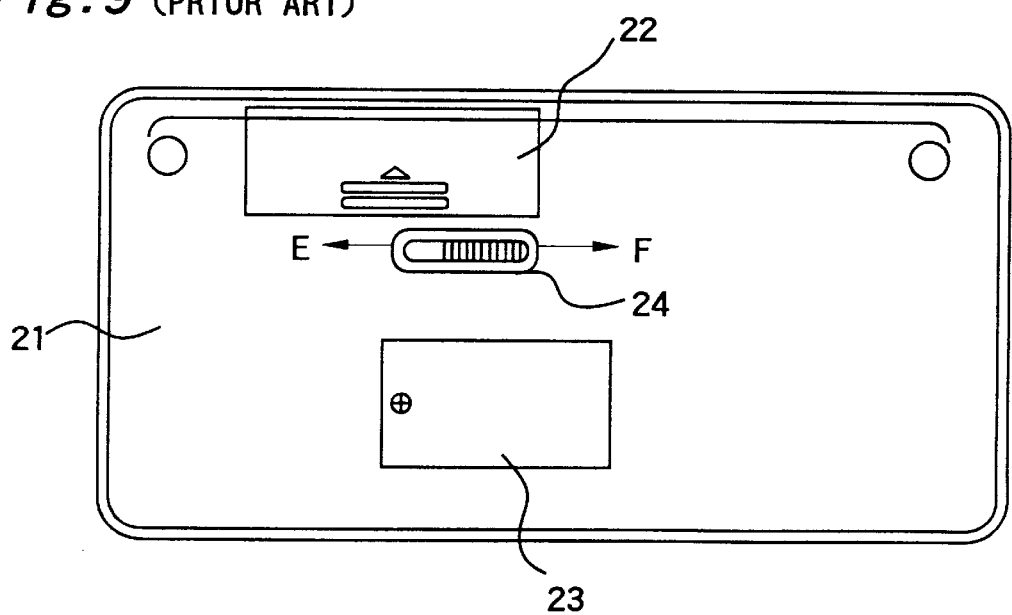
FIG. 9 is a schematic plan view showing a conventional battery-cover lock mechanism.

FIG. 8 shows the modified lock mechanism in such a posture that the operating batteries 12 have been set in the second seat and then the non-illustrated operating-battery cover (2) has been locked to close. When the second seat is thus loaded with the operating batteries 12, the sensor rod 17 is depressed to retract off the second seat under the loaded battery weight to assume a retracted position (FIG. 8) where the foot 15 can enter the cutout 16 of the lock lever 6 so that the lock button 4 can be moved in such a direction as to allow the backup-battery cover 3 to open. Given that the lock lever 6 additionally has the cutout 16, the backup-battery cover 3 cannot be opened as long as the second seat is empty, namely, until after the second seat is loaded with the operating batteries 12. With this arrangement, it is possible to prevent the backup battery from being removed by mistake while the operating batteries 12 are exchanged with new ones, thereby keeping backup data from disappearing.

According to the battery-cover lock mechanism in each of the foregoing embodiments, since the lock button follows an L-shape track as it travels between the three locking positions, it is possible to reliably lock the operating-battery cover and the backup-battery cover individually or collectively in option so that one of the operating battery and the backup battery is prevented from being inadvertently removed off the corresponding seat when the other battery is exchanged with a new one.

It is thus apparent that the present invention is not limited to the illustrated embodiments and that various modifications and changes may be suggested without departing from the scope and spirit of the invention.

What is claimed is:

1. A battery-cover lock mechanism for a battery-operated portable apparatus in which a backup battery is to be used in addition to an operating battery, comprising:

a latch for holding the operating battery and the backup battery in position individually or collectively;

a lower housing for supporting said latch, said lower housing having a first battery receiving region in which the operating battery is to be received, and a second battery receiving region in which the backup battery is to be received;

an operating-battery cover for covering said first battery receiving region; and a backup-battery cover for covering said second battery receiving region;

said latch including a lock button extending through said lower housing and a lock lever fixed to said lock button so as to sandwich said lower housing between said lock button and said lock levers, said lock button being movable between first, second and third positions;

said lock lever having a first locking portion for releasably locking said operating-battery cover in said first position and a second locking portion for releasably locking said backup-battery cover in said second position, in said third position, said first and second locking portions releasably locking both said operating-battery cover and said backup-battery cover;

said operating-battery cover having a first engaging portion adapted to be engaged with and disengaged from said first locking portion of said lock lever;

said backup-battery cover having a second engaging portion adapted to be engaged with and disengaged from said second locking portion of said lock lever; and wherein said lock button is movable from said third position to said first position along a first path and is movable from said third position to said second position along a second path substantially perpendicular to said first path.

2. A battery-cover lock mechanism according to claim 1, wherein said second path is an L-shaped path.

3. A battery-cover lock mechanism according to claim 1, wherein said first path is a straight path.

4. A battery-cover lock mechanism according to claim 1, wherein said lock button and said lock lever are disposed between said operating-battery cover and said backup-battery cover.

5. A battery-cover lock mechanism according to claim 1, wherein said latch has an E ring fastening said lock button and said lock lever together.

6. A battery-cover locking mechanism according to claim 1, wherein said first engaging portion of said operating-battery cover, said lower housing and said first locking portion of said lock lever respectively have a first claw, a second claw and a first tongue, said first and second claws being interengageable in such manner that said first claw is sandwiched between said second claw and said first tongue, whereby said operating-battery cover may be locked.

7. A battery-cover locking mechanism according to claim 1, wherein said second engaging portion of said backup-battery cover has a shelf and said second locking portion of said lock lever has a second tongue adapted to enter said shelf, whereby said backup-battery cover may be locked.

8. A battery-cover lock mechanism of a battery-operated portable terminal in which a backup battery is to be used in addition to an operating battery, comprising:

a latch for holding the operating battery and the backup battery in position individually or collectively;

a lower housing for supporting said latch, said lower housing having a first battery receiving region in which the operating battery is to be received, and a second battery receiving region in which the backup battery is to be received;

an operating-battery cover for covering said first battery receiving region; and a backup-battery cover for covering said second battery receiving region;

said latch including a lock button extending through said lower housing and a lock lever fixed to said lock button so as to sandwich said lower housing between said lock button and said lock lever, said lock button being movable between first, second and third positions;

said lock lever having a first locking portion for releasably locking said operating-battery cover in said first position and a second locking portion for releasably locking said backup-battery cover in said second position, in said third position, said first and second locking portions releasably locking both said operating-battery cover and said backup-battery cover;

said operating-battery cover having a first engaging portion adapted to be engaged with and disengaged from said first locking portion of said lock lever;

said backup-battery cover having a second engaging portion adapted to be engaged with and disengaged from said second locking portion of said lock lever; and wherein said lock button is movable from said third position to said first position in a first path and is movable from said third position to said second position along a second path substantially perpendicular to said first path.

9. A battery-cover lock mechanism of a battery-operated portable terminal according to claim 8, wherein said second path is an L-shaped path.

10. A battery-cover lock mechanism of a battery-operated portable terminal according to claim 8, wherein said first path is a straight path.

11. A battery-cover lock mechanism of a battery-operated portable terminal according to claim 8, wherein said lock button and said lock lever are disposed between said operating-battery cover and said backup-battery cover.

12. A battery-cover lock mechanism of a battery-operated portable terminal according to claim 8, wherein said latch has an E ring fastening said lock button and said lock lever together.

13. A battery-cover locking mechanism of a battery-operated portable terminal according to claim 8, wherein said first engaging portion of said operating-battery cover, said lower housing and said first locking portion of said lock lever respectively have a first claw, a second claw and a first tongue, said first and second claws being interengageable in such manner that said first claw is sandwiched between said second claw and said first tongue, whereby said operating-battery cover may be locked.

14. A battery-cover locking mechanism of a battery-operated portable terminal according to claim 8, wherein said second engaging portion of said backup-battery cover has a shelf and said second locking portion of said lock lever has a second tongue adapted to enter said shelf, whereby said backup-battery cover may be locked.

* * * * *